(12) United States Patent
Robinson et al.

(10) Patent No.: US 8,436,992 B2
(45) Date of Patent: May 7, 2013

(54) LOW DISTORTION SPECTROMETER

(75) Inventors: Ian S. Robinson, Redondo Beach, CA (US); Lacy G. Cook, El Segundo, CA (US); Yifal J. Shaham, Los Angeles, CA (US)

(73) Assignee: Raytheon Company, Waltham, MA (US)

(*) Notice: Subject to any disclaimer, the term of this patent is extended or adjusted under 35 U.S.C. 154(b) by 127 days.

(21) Appl. No.: 13/191,782

(22) Filed: Jul. 27, 2011

(65) Prior Publication Data
US 2013/0027699 A1    Jan. 31, 2013

(51) Int. Cl.
G01J 3/28     (2006.01)
(52) U.S. Cl.
USPC .......................................................... 356/328
(58) Field of Classification Search .................. 356/302, 356/305, 326, 328
See application file for complete search history.

(56) References Cited

U.S. PATENT DOCUMENTS

| | | |
|---|---|---|
| 5,260,767 A | 11/1993 | Cook |
| 6,122,051 A | 9/2000 | Ansley et al. |
| 7,382,498 B1 | 6/2008 | Cook |
| 7,703,932 B2 | 4/2010 | Cook |
| 2004/0239931 A1 | 12/2004 | Teichmann et al. |
| 2008/0266687 A1 | 10/2008 | Cook |
| 2009/0045478 A1* | 2/2009 | Hui .............................. 257/434 |
| 2010/0053609 A1 | 3/2010 | Chrisp |

OTHER PUBLICATIONS

Mouroulis, Pantazis et al., "Design of Pushbroom Imaging Spectrometers for Optimum Recovery of Spectroscopic and Spatial Information", Applied Optics, vol. 39, No. 13, May 1, 2000.
Haring, Robert et al. "The Orgiting Carbon Observatory (OCO) Instrument Optical Design", California Institute of Technology Jet Propulsion Laboratory, Date Unavailable.
NASA's Jet Propulsion Laboratory, "Low-Distortion Imaging Spectrometers", http://moonmineralogymapper.jpl.nasa.gov/docs/Low-distortion_imaging_spectrometer.pdf, accessed Jun. 25, 2012.
Immersaview, "Geometric Correction" http://www.immersaview.com/whitepapers/geometric-correction, accessed Oct. 29, 2010.
Cook, Lacy G. et al., "Imaging Spectrometer Trade Studies: A Detailed Comparison of the Offner-Chrisp and Reflective Triplet Optical Design Forms", Raytheon Airborne Company, Space and Airporne Systems. Date Unavailable.
Silny, John et al., "Large Format Imaging Spectrometers" Raytheon Space and Airborne Systems, Air Force Research Laboratory, Naval Research Laboratory, Date Unavailable.

* cited by examiner

Primary Examiner — Tarifur Chawdhury
Assistant Examiner — Abdullahi Nur
(74) Attorney, Agent, or Firm — Lando & Anastasi, LLP

(57) ABSTRACT

An imaging assembly for a spectrometer includes a substrate with first and second modules thereon containing respective arrays of detector elements positioned so the arrays are elongated along a first axis with a gap therebetween. A third module including a third array of detector elements is also thereon, spaced from the first axis, at least as long as the gap, and smaller than the elongation of either of the first or second arrays. Further thereon are first and second slits elongated along a second axis spaced from and generally parallel to the first axis, each being at least as long as the respective arrays. A third slit at least as long as the gap is also therein, spaced from the first axis, second axis, and third array such that the gap, third slit, and third array are generally along a third axis generally perpendicular to the first and second axis.

13 Claims, 4 Drawing Sheets

LOW DISTORTION SPECTROMETER

BACKGROUND

Spectrometers are devices that are configured to be able to receive electromagnetic radiation (i.e. light) in a plurality of wavelengths across the electromagnetic spectrum. Such electromagnetic radiation may be imaged by the spectrometer, and may subsequently be utilized in spectroscopic analysis for a number of purposes, including, for example, to perform target material identification based on the spectroscopic signature. The imaging by the spectrometer may be of electromagnetic radiation passed through one or more slits, and accomplished by one or more image sensors assembled at a focal plane for the spectrometer optics. In some spectrometers (generally double-pass spectrometers), the slits and the image sensors may be positioned adjacent to one another at the focal plane for the spectrometer optics. It may be appreciated, however, that depending on the configuration of the spectrometer optics, conventional imaging arrays might be unable to receive the entire field of view that is received by the optics.

FIG. 1 illustrates a schematic of image plane assembly 10 containing image sensor 100, and associated slit 110. Although not shown, it may be appreciated that electromagnetic radiation, focused by fore-optics, may pass through the slit 110 to be emitted out of the plane of the Figure. A spectrometer may then collimate the electromagnetic radiation, break it into its constituent spectra, and then image the electromagnetic radiation into the plane of the Figure, and onto the image sensor 100. Each image sensor 100 may be packaged as part of a sensor chip assembly (SCA) 120, whereby the image sensor is surrounded by associated electronics and interconnects (generically, packaging 130). The image sensor on each SCA 120 may generally contain an array of electromagnetic radiation sensitive elements 140. For spectroscopic purposes, the image sensor 100 may be generally rectangular, having a spatial dimension and a spectral dimension. The image sensors may be elongated in first direction 150, also equivalently known as a cross-track direction, or cross-scan direction, or the spatial dimension. The image sensor may be shorter in length in second direction 160, also equivalently known as the along-track direction, the along-scan direction, or the spectral dimension.

Depending on the field of view achievable by the fore-optics and the spectrometer (collectively the optics field of view) a single image sensor 100 may be insufficient to record all electromagnetic radiation within the optics field of view. Various design constraints on image sensors 100 may be limiting in terms of size and/or pixel density. It may be appreciated that the optics may be associated with a region of image plane assembly 10 that is defined by slits 110 and image sensors 100 thereon. Specifically, the spectrometer optics must be configured to receive electromagnetic radiation from slit 110, disperse it, and redirect it to image sensor 100. As shown, this region may be characterized as theoretical sensitivity region 170. In essence, the spectrometer optics will generally be corrected for image quality and distortion across sensitivity region 170, to limit distortion in the electromagnetic radiation being received from slits 110, and being dispersed and reflected onto image sensors 100.

Accordingly, it may be appreciated that multiple image sensors 100 may be utilized together so as to facilitate recording most or all of the desired or required optics field of view. Because of packaging 130 associated with each image sensor 100, it may be appreciated that multiple image sensors 100 would not be positioned immediately adjacent to one another, but would necessarily be separated by a gap. Accordingly, the size of the gap would be at least the size of packaging 130 associated with each image sensor 100. The gap could also be larger, so as to promote uniformity and symmetry in the arrangement of image sensors 100 at image plane assembly 10. It may be appreciated that such gaps may enlarge theoretical sensitivity region 170 in various designs of image plane assembly 10.

As used herein, the numbering conventions associated with elements of image plane assembly 10 in FIG. 1 may be understood as referring generically to those elements or assemblies, whereby variations on those numbers will apply to similar elements or assemblies. Accordingly, FIG. 2 depicts a conventional "checkerboard design" for image plane assembly 10 (as image plane assembly 10*), configured to utilize multiple image sensors 100* to facilitate imaging over a large field of view provided by the unseen optics. As shown, the checkerboard design of image plane assembly 10* utilizes a plurality of SCAs 120* (including specifically SCA 120a* and SCA 120b*) and associated slits 110* (including specifically slit 110a* and slit 110b*), in a staggered configuration. Each SCA 120* contains an image sensor 100* (including specifically image sensor 100a* and image sensor 100b*) and associated packaging 130* (including specifically packaging 130a* and packaging 130b*). The unseen fore-optics are configured to focus electromagnetic radiation onto the slits 110*, while the unseen spectrometer is configured to receive the electromagnetic radiation from the slits 110*, focus and disperse the electromagnetic radiation into constituent spectra, and direct the spectra onto the associated image sensor 100.

As depicted in the illustrated image plane assembly 10*, to fully utilize the field of view across the combined optics with the checkerboard configuration, the spectrometer must be configured as sensitive and accurate to theoretical sensitivity region 170*, which includes all of slits 100* and the associated SCAs 120* of image plane assembly 10*, including the gaps therebetween. As appreciated from FIG. 2, sensitivity region 170* may exclude some of packaging 130* (namely the bottoms of packaging 130a* and packaging 130* from other SCAs 120* on the bottom row of image plane assembly 10*), as electromagnetic radiation is neither received from nor directed to those portions of the SCAs 120*. While in theory corrections for image quality and distortion are unnecessary between slits 110* and image sensors 100*, for reasons such as cost and efficiency, spectrometer optics design generally does not provide for such intermediate corrections, but rather corrects over broader uniform regions. It may be appreciated that improvements to image plane assemblies 10 may facilitate either a greater field of view for the same level of distortion (i.e. facilitating making the focal planes larger to see more of a given scene at a time), or lower distortion for the same field of view (i.e. increasing performance for the same size of focal plane and optics). Accordingly, what is needed is a construction and arrangement of image plane assembly 10 that facilitates such improvements.

SUMMARY

According to an embodiment, an imaging assembly for a spectrometer includes a substrate. A first and a second module are disposed on the substrate, and contain associated first and second arrays of detector elements and positioned on the substrate. The first and second arrays have an elongation along a first axis, and are spaced from one another on the first axis so as to form a gap between the first and second arrays. A gap filler module is disposed on the substrate, and includes a gap filler array of detector elements spaced from said first axis. The gap filler array is at least as long as the gap, and smaller than the elongation of either of the first or second arrays. The substrate further includes a first slit and a second slit disposed thereon, and has an elongation along a second axis spaced from and generally parallel to the first axis. Each of the first and second slits is at least as long as the first and second arrays respectively. Additionally, a gap filler slit that is at least as long as the gap is disposed on the substrate spaced from the first axis, the second axis, and the gap filler array, such that the gap, the gap filler slit, and the gap filler array are generally positioned along a third axis that is generally perpendicular to the first axis and the second axis.

BRIEF DESCRIPTION OF THE DRAWINGS

The appended figures form part of the original disclosure, in which.

DETAILED DESCRIPTION

The disclosure and embodiments described herein are related to U.S. Pat. Nos. 5,260,767, 6,122,051, and 7,703,932, each of which is hereby incorporated by reference in its entirety.

Figure 1:
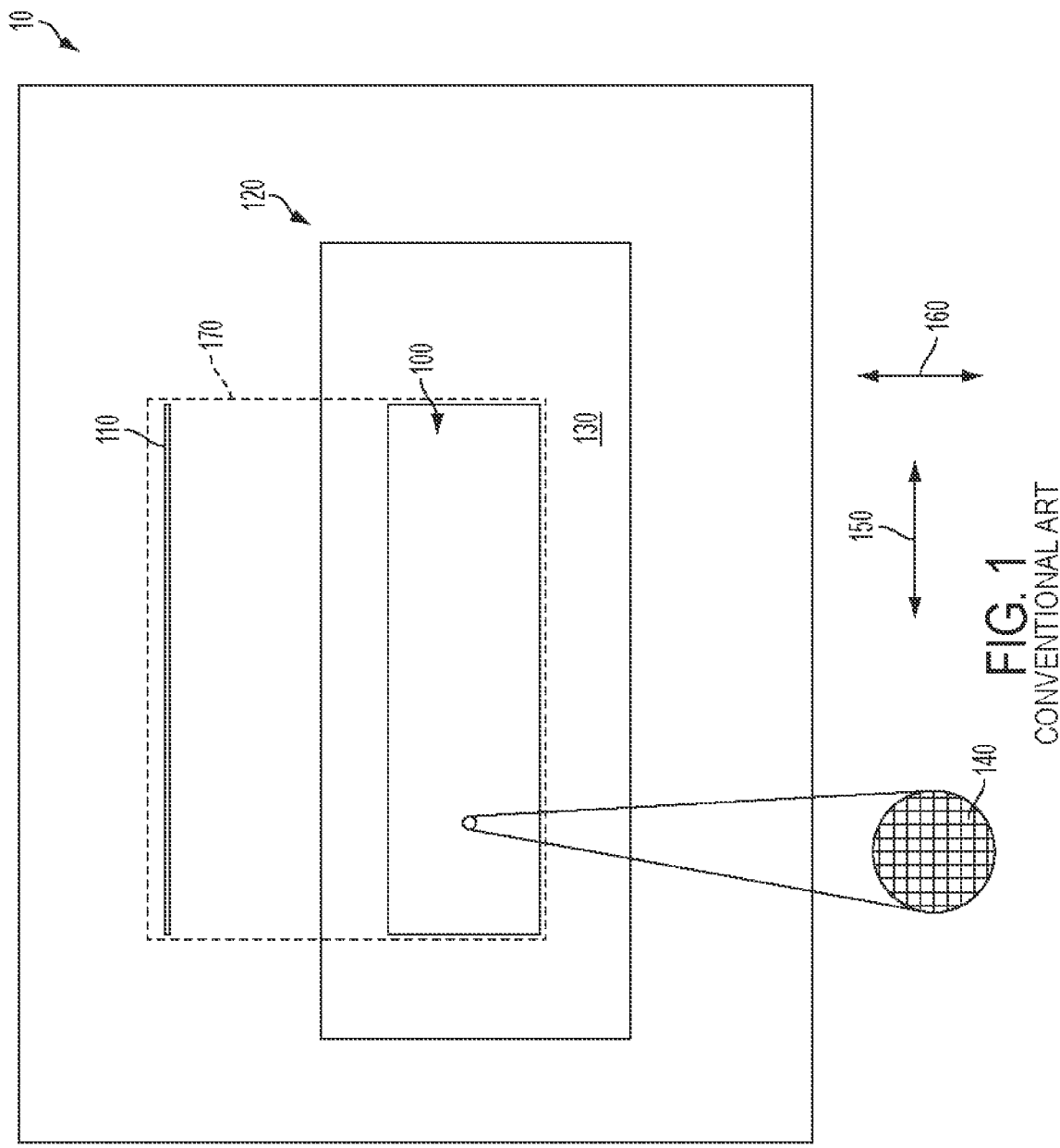
FIG. 1 depicts a schematic spectrometer-facing side of a conventional optical imaging assembly, having a slit configured to receive electromagnetic radiation from a fore-optics system, and an image sensor configured to receive dispersed electromagnetic radiation from a spectrometer imaging the slit.
Figure 2:
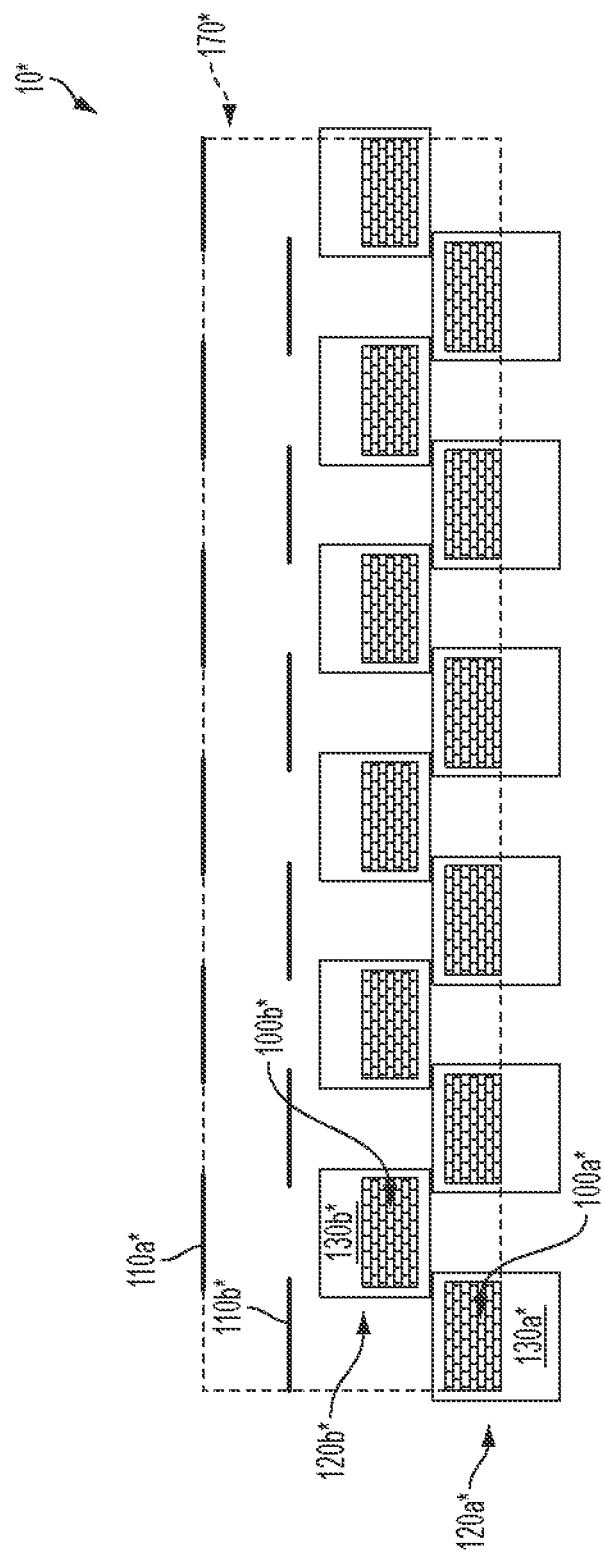
FIG. 2 depicts a schematic spectrometer-facing side of another conventional optical imaging assembly, similar to that of FIG. 1, but having a plurality of slits and image sensors, so as to facilitate imaging of a wider field of view.
Figure 3:
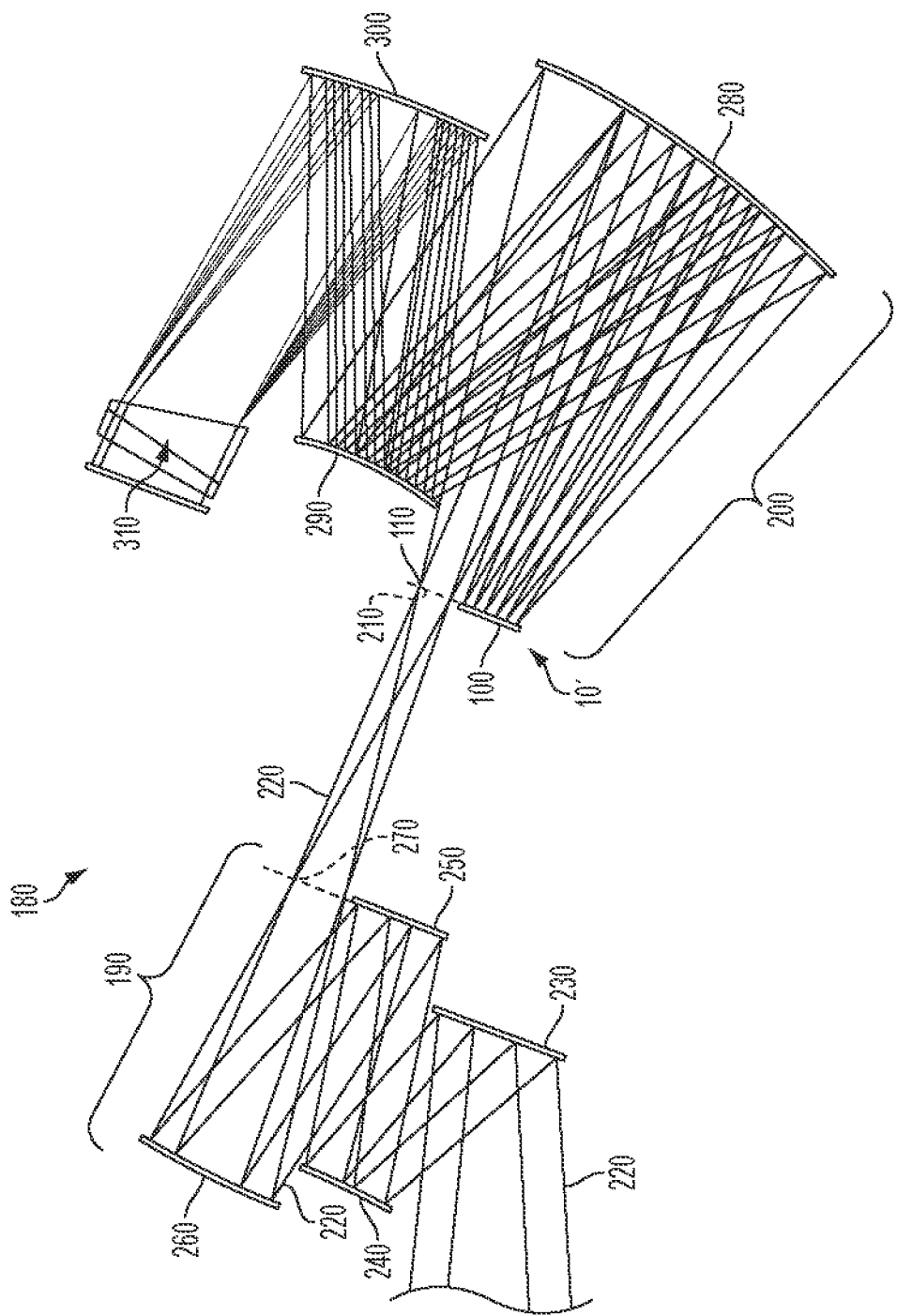
FIG. 3 depicts an exemplary spectrometer imaging system configured to utilize an embodiment of an optical imaging assembly of the present disclosure.

FIG. 3 shows optical system 180, configured to utilize fore-optics 190 and spectrometer 200. In the illustrated embodiment, fore-optics 190 is similar to that of the optical imaging system disclosed in U.S. Pat. No. 7,703,932, incorporated by reference above. As shown, optical system 180 further includes image plane assembly 10, which is located at a common image plane 210 for both fore-optics 190 and spectrometer 200, to collimate, disperse, and focus electromagnetic radiation along a beam path 220. It may be appreciated that fore-optics 190 and spectrometer 200 may be of any suitable construction or configuration, and may vary across embodiments. In the illustrated embodiment, however, fore-optics 190 contains therein primary mirror 230 configured to receive electromagnetic energy from the scene. In the illustrated embodiment, primary mirror 230 is negative (but near zero) optical-powered. Secondary mirror 240 is also provided, and is configured to receive the electromagnetic energy from primary mirror 230. As shown, secondary mirror 240 is also negative-optical-powered. Tertiary mirror 250 is configured as negative-optical-powered, and configured to receive the electromagnetic energy from secondary mirror 240. Further along beam path 220, positive-optical-powered quaternary mirror 260 is located and configured to direct the electromagnetic radiation through external posterior aperture stop 270 to image plane 210.

It may be appreciated that external posterior aperture stop 270 on beam path 220, is an aperture (or location where an aperture may be located) positioned between the last powered mirror (i.e. quaternary mirror 260), and image plane 210. In some embodiments, optical system 180 preferably has no aperture or stop positioned on beam path 220 prior to the last powered mirror. In various embodiments, other mirrors, lenses, or filters may additionally or alternatively be provided in fore-optics 190. It may also be appreciated that "optically powered" mirrors have a non-zero (i.e. positive or negative) optical power, and thus are curved, while mirrors with zero optical power are flat. In the illustrated embodiment, the sum of the optical powers of primary mirror 230, secondary mirror 240, tertiary mirror 250 and quaternary mirror 260 is essentially zero.

Further shown in optical system 180 is that spectrometer 200 is configured as a double-pass reflective triplet, comprising primary mirror 280, secondary mirror 290, tertiary mirror 300, and dispersive element 310. As described in greater detail below, electromagnetic radiation passing through slits 110 located in image plane assembly 10 at image plane 210 are dispersed by dispersive element 310 of spectrometer 200 before being reflected back to image sensors 100 also located on image plane assembly 10 at image plane 210. It may be appreciated from the illustrated embodiment that spectrometer 200 is configured to receive electromagnetic radiation from slits 110, disperse the electromagnetic radiation, and reflect the resultant spectra to a location on image plane 210 offset from slits 110, where it may be received by image sensors 100. In the illustrated embodiment, spectrometer optical system 200 is similar to the optical system disclosed in U.S. Pat. No. 5,260,767, incorporated by reference above.

In various embodiments, dispersive element 310 may be of any suitable construction or configuration. Although, in the illustrated embodiment of spectrometer 200, dispersive element 310 is configured as a prism, in other embodiments a diffraction grating or other such element may be utilized. Furthermore, while the prism of dispersive element 310 of the illustrated embodiment is configured as a two-material prism, the illustrated configuration as such is not intended to be limiting in any way.

Figure 4:
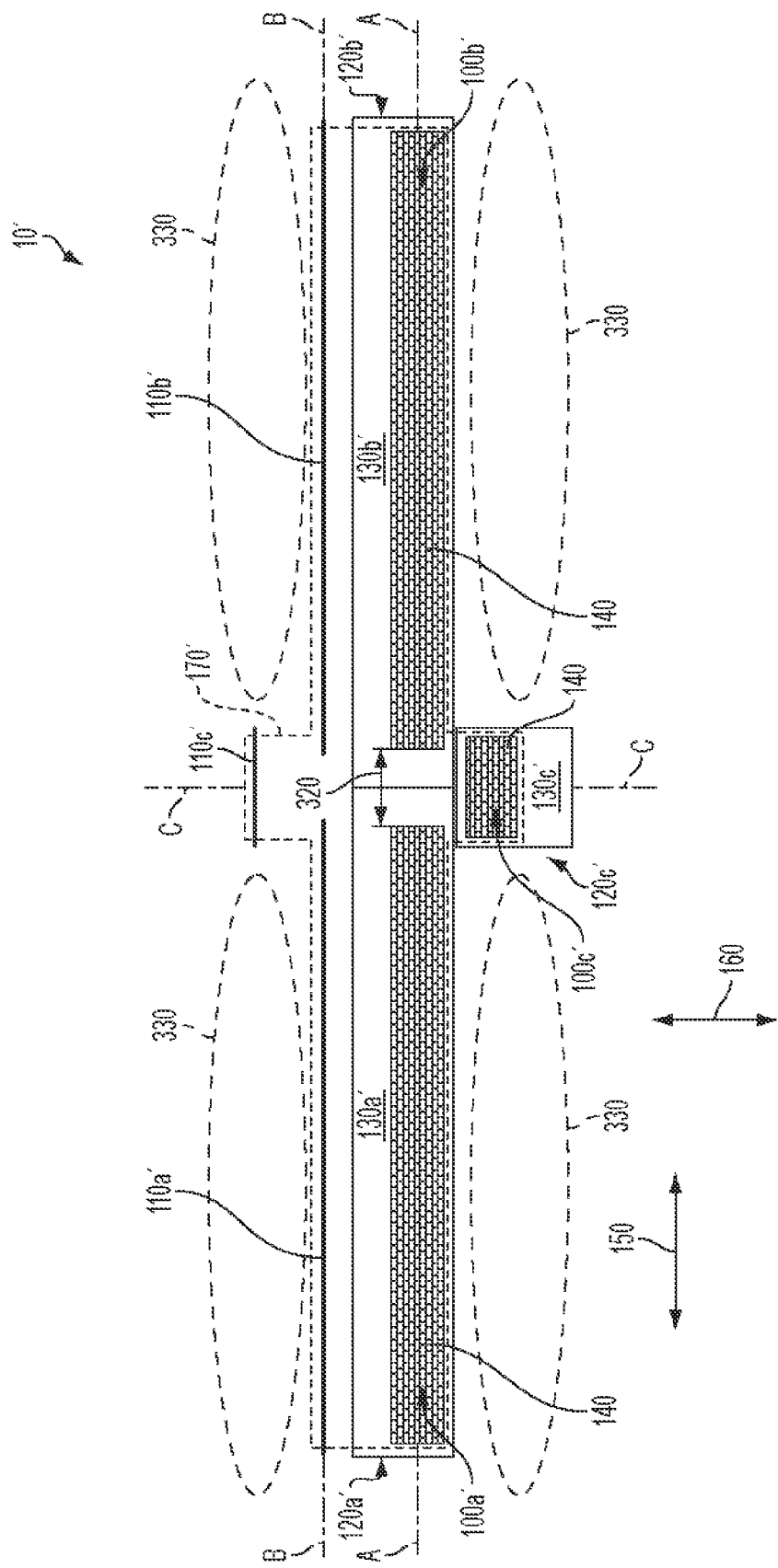
FIG. 4 depicts a schematic spectrometer-facing side of the optical imaging assembly of the present disclosure.

As indicated above, it may be appreciated that in some embodiments, spectrometer 200 may generally have a wide field of view that exceeds imaging on a single image sensor 100. As also appreciable from the above, the arrangement of slits 110 and image sensors 100 on image plane assembly 10 may impact how much data may be recorded at a time utilizing spectrometer 200, and how improvements to such arrangements may increase the amount of data recordable at a time utilizing the same spectrometer optics, or may allow the same amount of data to be recorded at a time utilizing different spectrometer of lesser optical qualities. Accordingly, FIG. 4 depicts an improved image plane assembly 10 (as image plane assembly 10') that includes therein a first SCA 120a' and a second SCA 120b'. It may be appreciated that image sensors 100a' and 100b' thereof may be positioned on and elongated along first axis A extending along first direction 150, such that electromagnetic radiation sensitive elements 140 thereof are arranged in an array that has more elements 140 in first direction 150 along first axis A than in second direction 160. In some embodiments, a size of each of image sensors 100a' and 100b' in first direction 150 may be as long as can be practically created, so that in combination as large a spatial extent as permitted by the optics of fore-optics 190 and the optics of spectrometer 200 are capable of being imaged. It may be appreciated that a size of each of image sensors 100a' and 100b' in second direction 160 may be sufficiently large so as to receive a desired amount of spectra as formed from dispersive element 310. In particular, the size of each of image sensors 100*a*' and 100*b*' in second direction 160 may be dependent upon the focal plane pitch of spectrometer 200, and the number of colors in the spectra to be received thereon. In some embodiments, each of image sensors 100*a*' and 100*b*' may be characterized as arrays in terms of the number of elements 140 in first direction 150 by the number of elements 140 in second direction 160. For example, in some embodiments, each of image sensors 100*a*' and 100*b*' may be 3000×256 of elements 140. In other embodiments, image sensors 100*a*' and 100*b*' may be larger or smaller in either direction, provided that the number of elements 140 in first direction 150 exceeds the number of elements 140 in second direction 160. In some non-limiting embodiments, for example, each image sensor 100' may be approximately 3000-5000 elements 140 along first direction 150.

It may be appreciated that the construction and configuration of image sensors 100' may vary across embodiments. For example, in an embodiment one or more of image sensors 100' may be mercury cadmium telluride based. In other embodiments, image sensors 100' may be based on other materials, such as but not limited to Indium Antimonide, silicon, extrinsic silicon, Indium Gallium Arsenide, or so on. Additionally, in various embodiments, the size of elements 140 of each image sensor 100' may determine the overall size of image sensors 100'. For example, in some embodiments, each element 140 may be approximately 20 µm on a side. In other embodiments, each element 140 may be greater or smaller, including but not limited to being 18 µm in size, 16 µm in size, or 12 µm in size. It may be appreciated that the greater number of elements 140 for a given focal length of the spectrometer 200, the greater the spatial and spectral resolution of optical system 180.

As shown in FIG. 4, packaging 130*a*' and 130*b*' for each of SCA 120*a*' and 120*b*', which may contain associated connectors, electronics, breadboards, and so on for image sensors 100*a*' and 100*b*' respectively, generally does not permit adjacent positioning of image sensor 100*a*' and 100*b*' that would otherwise facilitate a continuous and spatially uninterrupted readout of each of elements 140 of image sensor 100*a*' and each of elements 140 of image sensor 100*b*'. For example, practicalities of mounting image sensors 100' onto image plane assembly 10', or the potential for damage to image sensors 100' when cutting image sensors 100' from a wafer, may necessitate surrounding each side by some thickness of packaging 130'. As shown, packaging 130*a*' and 130*b*' between image sensors 100*a*' and 100*b*' forms gap 320 therebetween, which also extends along first axis A. Although in the illustrated embodiment SCA 120*a*' and 120*b*' are adjacent, such that only packaging 130*a*' and 130*b*' form gap 320, in other embodiments an additional spacing between SCA 120*a*' and 120*b*' may also be present for any reason, and contribute to gap 320. As may also be appreciated from the illustrated embodiment, packaging 130*a*' and 130*b*' may be of different sizes at different sides of image sensors 100*a*' and 100*b*', and image sensors 100*a*' and 100*b*' do not necessarily have to be centered in packaging 130*a*'. While in some embodiments image sensors 100*a*' and 100*b*' may be positioned such that gap 320 is as small as possible, in other embodiments a "larger" side of packaging 130*a*' and/or 130*b*' may be positioned to form gap 320. In various embodiments, gap 320 may be less than approximately half the size of either of SCA 120*a*' or SCA 120*b*'. In an embodiment, gap 320 may be less than approximately $1/10^{th}$ the size of either of SCA 120*a*' or SCA 120*b*'. In yet another embodiment, gap 320 may be less than approximately $1/20^{th}$ the size of either SCA 120*a*' or SCA 120*b*'.

Positioned below SCA 120*a*' and 120*b*' is gap filler SCA 120*c*', containing therein gap filler image sensor 100*c*' surrounded by associated packaging 130*c*'. As shown, gap filler image sensor 100*c*' is positioned spaced from first axis A along second direction 160 (i.e. underneath image sensors 100*a*' and 100*b*' in the illustrated embodiment), so as to cover gap 320 between image sensors 100*a*' and 100*b*' along first direction 150. As described below, in some embodiments elements 140 of gap filler image sensor 100*c*' may slightly overlap elements 140 of image sensor 100*a*' and 100*b*' in first direction 150. It may be appreciated that because gap filler image sensor 100*c*' serves to cover gap 320 between image sensor 100*a*' and 100*b*', it is accordingly smaller in length along first direction 150 than either of image sensor 100*a*' and image sensor 100*b*'. It may be appreciated, however, that because the spectral data received thereon is generally the same, in many embodiments the size of gap filler image sensor 100*c*' along second direction 160 may be generally the same as either of image sensors 100*a*' and 100*b*'. For example, in an embodiment where each of image sensors 100*a*' and 100*b*' are 3000×256 arrays of elements 140, gap filler image sensor 100*c*' may also have approximately 256 elements 140 in second direction 160. In some embodiments, gap 320 may be approximately square in shape. Accordingly, in some embodiments gap filler image sensor 100*c*' may also be approximately square in shape. For example, in some embodiments, gap 320 may be sufficiently small so as to be covered by a 256×256 array of elements 140 in image sensor 100*c*'. As shown, gap filler image sensor 100*c*' may be spaced from image sensor 100*a*' and image sensor 100*b*' in second direction 160 by a gap filler sensor spacing distance. In various embodiments, the gap detector spacing distance may be as little as being determined by the size of packaging 130*a*', 130*b*', and 130*c*' proximal to gap 320, such that gap filler SCA 120*c*' is below but adjacent to both SCA 120*a*' and SCA 120*b*'. In other embodiments, gap filler SCA 120*c*' may be spaced from SCA 120*a*' and SCA 120*b*' below gap 320 by some amount.

Further shown in FIG. 4 are slits 110' associated with image plane assembly 10'. It may be appreciated that slits 110' may be cut into or otherwise formed in image plane assembly 10', such that a portion of the electromagnetic radiation in beam path 220 may pass from fore-optics 190 to spectrometer 200. As described above, each slit 110 may correspond to an associated one of image sensors 100. For example, in the illustrated embodiment slit 110*a*' is associated with image sensor 100*b*', while slit 110*b*' is associated with image sensor 100*a*'. It may be appreciated that both inversion and reversion from the slits 110 to the image sensors 100 occurs with double pass optics. As shown, slits 110*a*' and 110*b*' extend along first direction 150 in second axis B, which is spaced from and generally parallel to first axis A. In an embodiment, slits 110*a*' and 110*b*' may generally be at least the same size as image sensors 100*a*' and 100*b*' respectively. In other embodiments, however, slits 110*a*' and 110*b*' may be longer, as the additional electromagnetic radiation from longer slits 110*a*' and 110*b*' would be redirected by spectrometer 200 off of image sensors 100*a*' and 100*b*', and thus would just be unutilized extra space. It may be appreciated, however, that in some embodiments longer slits 110*a*' and 110*b*' may be beneficial. As an example, in some embodiments slit 110*a*' and slit 110*b*' may each extend into one another along second axis B, such that they form a single slit configured to receive electromagnetic radiation that will be dispersed and imaged for both image sensor 100*a*' and image sensor 100*b*'. Such a configuration may be beneficial for manufacturing reasons (i.e. by permitting a single cut instead of multiple cuts to form slits 110*a*' and 110*b*' in image plane assembly 10'). As may be understood from FIG. 4, in such an embodiment, electromagnetic radiation being received by a slit portion extending between slit 110*a*' and slit 110*b*' as depicted would be dispersed by spectrometer 200 and reflected into gap 320 (i.e. outside of the space being imaged by image sensors 100*a*' and 100*b*').

It may be appreciated that slit 110*a*' and slit 110*b*' are positioned spaced from image sensor 100*a*' and 100*b*' respectively by a slit spacing distance, which may be the distance between first axis A and second axis B. It may be understood that the slit spacing distance is the same for both slit 110*a*' and 110*b*', as slit 110*a*' and 110*b*' both extend along second axis B. The slit spacing distance may be of any appropriate size, and may in some embodiments be generally as small as possible. For example, in an embodiment slits 110*a*' and 110*b*' may be positioned immediately above SCA 120*a*' and SCA 110*b*' respectively, such that slits 110*a*' and 110*b*' are adjacent to packaging 130*a*' and 130*b*'. The distance between slit 110*c* and slits 110*a*-110*b* (in the along-scan dimension) will generally be the same as the distance between the first row of detectors on 100*c* and the first row of detectors on 100*a*-100*b*. The distance between the second axis B and detectors 100*a*-100*b* should generally be as small as possible, generally limited by region 130*a*-130*b* and any other relevant manufacturing issues. As shown in the illustrated embodiment, however, in some embodiments slits 110*a*' and 110*b*' may be spaced above SCA 120*a*' and 120*b*'.

Depicted above gap 320, and associated with gap filler image sensor 100*c*' is gap filler slit 110*c*', which covers gap 320 along first direction 150. Gap filler slit 110*c*' may be spaced from gap 320 and slits 110*a*' and 110*b*', such that the combination of slits 100 and image sensors 100 generally form the shape of a plus sign with elongated horizontal arms along first direction 150, with shorter arms in second direction 160 (covering gap filler image sensor 100*c*' and gap filler slit 110*c*'). As shown, the shorter arms in second direction 160 form third axis C, which is generally perpendicular to first axis A and second axis B, and generally contains thereon gap filler slit 110*c*', gap 320, and gap filler image sensor 100*c*'. It may be appreciated that electromagnetic radiation passing through gap filler slit 110*c*' would be dispersed by spectrometer 200, and reflected onto gap filler image sensor 100*c*'. In some embodiments, gap filler image sensor 100*c*' is read-out differently from image sensors 100*a*' and 100*b*', such that as the data is recorded, the spatial offset of the imaged scene for image data received on gap filler image sensor 100*c*' is accounted for. In other embodiments, other corrections to ensure continuity of data associated with an imaged scene are additionally or alternatively possible.

It may be appreciated that the general elongated cross shape that contains on the longer arms both image sensors 100*a*' and 100*b*' and slits 110*a*' and 110*b*', and on the shorter arms gap filler image sensor 100*c*' and gap filler slit 110*c*', may define theoretical sensitivity region 170' associated with image plane 10'. In contrast to theoretical sensitivity region 170\* of conventional image plane assembly 10\* described above, it may be appreciated that theoretical sensitivity region 170' forms a narrower cross section. While spectrometer 200 configured to interact with conventional image plane assembly 10\* would need to be configured to counteract distortion across the larger area of theoretical sensitivity region 170\*, in the illustrated embodiment of image plane assembly 10', design requirements for spectrometer 200 may be relaxed at the four elongated corner regions 330. Accordingly, it may be appreciated that a wider field of view may be imaged utilizing such a configuration on a given spectrometer 200 and optical system 180, or a given field of view may be imaged utilizing a less exacting spectrometer and optical system. It may be appreciated that in some embodiments image plane assembly 10' may include multiple repeated sets of image sensors 100*a*' and 100*b*', with gap filler image sensors 100*c*' therebetween as well as between each repeated set, however typically the benefit to field of view or benefit of reduction in requirements of spectrometer 200 in the corner regions 330 would only be at the outermost edges along the image plane 210.

As indicated above, in some embodiments an overlap in first direction 150 between gap filler image sensor 100*c*' and each of image sensors 100*a*' and 100*b*' may be present in image plane array 10'. A corresponding overlap would also be found in slit 110*c*', corresponding to slits 110*a*' and 110*b*'. Such overlaps may be of any appropriate size, including but not limited to corresponding to the width of a set number of elements 140. For example, in some embodiments the overlap may be approximately between 10-20 elements 140 at each side. A greater or lesser overlap is also possible in some embodiments. It may be appreciated that the overlap may be useful for any number of reasons, including but not limited to allowing calibration between the data recorded on SCA 120*a*' and 120*b*' with data recorded on gap filler SCA 120*c*'. For example, when corrected for spatial positioning, if data on each of image sensors 100*a*' and 100*b*' matches that of gap filler image sensor 100*c*', then optical system 180 may be understood to be calibrated. Likewise, if there is an incongruity between the imaged data, then a lack of calibration either in the readouts of SCAs 120, or in the alignment or assembly of fore-optics 190 and/or spectrometer 200, may be ascertained. The overlap may additionally or alternatively facilitate preventing data loss across first direction 150 (i.e. from scan direction errors in the transition between either of image sensors 100*a*' and 100*b*' and gap filler image sensor 100*c*').

In various embodiments, components of image plane assembly 10' may be assembled onto or formed into any appropriate mounting, including but not limited to a motherboard, metering plate, or combination thereof, which may be characterized as a planar substrate generally along image plane 210. It may be appreciated however, that the planar substrate may extend into other planes beyond image plane 210 as well. In an embodiment, the slits 110' may be cut through or otherwise formed in the planar substrate, while the SCAs 120 may be assembled on the planar substrate. In an embodiment, image sensors 100' may be mounted as recessed from an edge portion of slits 110' proximal to spectrometer 200, such that a light-sensitive surface of image sensors 100' and the edge portion of slits 110' are generally along image plane 210.

Noted above is that while in some embodiments a certain level of distortion at image plane assembly 10' may be maintained using relaxed design requirements for the remainder of fore-optics 190 and spectrometer 200 of optical system 180, in other embodiments, utilizing the same optics may facilitate lesser distortion at image plane assembly 10'. It may be appreciated that various forms of distortion may typically arise in optical systems such as optical system 180, and may be reduced by utilizing image plane assembly 10'. For example, keystone distortion may impact detection of sub-pixel targets when performing target detection using spectrometer 200. In some embodiments, image plane assembly 10' may reduce keystone distortion to approximately 1.4 μm (or approximately 7% of one of elements 140), which may be approximately 35% of keystone distortion in conventional arrangements. It may be appreciated that in some conventional configurations, to achieve such keystone distortion levels would otherwise limit the image plane assembly 10 to approximately 3200 elements 140 in first direction 150, necessitating a narrower field of view than possible with the arrangement of image plane assembly 10'. In some embodiments, smile distortion variation may be reduced to approximately 3.7 µm (or approximately 19% of one of elements 140). It may be appreciated that in some embodiments there may be some slight in plane curvature of slits 110a' and 110b' to correct for smile distortion. Likewise, in some embodiments image wavefront error aberration may be reduced to approximately 0.096 waves (diffraction limited at 1.35 µm). It may be appreciated that in some embodiments the gap filler image sensor 100c' and the associated gap filler slit 110c' may be positioned and/or centered along an axis of bilateral symmetry for spectrometer 200, further facilitating reduction of distortion through symmetric corrections, while distortions at corners 330 are not imaged, and thus may be ignored.

The foregoing detailed description has set forth various embodiments of the devices and/or processes by the use of diagrams, flowcharts, and/or examples. Insofar as such diagrams, flowcharts, and/or examples contain one or more functions and/or operations, it will be understood by those within the art that each function and/or operation within such diagrams, flowcharts, or examples can be implemented, individually and/or collectively, by a wide range of hardware, software, firmware, or virtually any combination thereof.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation.

The subject matter described herein sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An imaging assembly for a spectrometer comprising:
   a substrate;
   a first and a second module disposed on said substrate, containing associated first and second arrays of detector elements and positioned on the substrate such that the first and second arrays have an elongation along a first axis and are spaced from one another on the first axis so as to form a gap between the first and second arrays;
   a gap filler module disposed on said substrate, and including a gap filler array of detector elements spaced from said first axis, the gap filler array being at least as long as the gap and smaller than the elongation of either of the first or second arrays;
   a first slit and a second slit disposed on said substrate and having an elongation along a second axis spaced from and generally parallel to the first axis, each of the first and second slits being at least as long as the first and second arrays respectively; and
   a gap filler slit that is at least as long as the gap, disposed on said substrate spaced from said first axis, said second axis, and said gap filler array, such that the gap, the gap filler slit, and the gap filler array are generally positioned along a third axis that is generally perpendicular to the first axis and the second axis.

2. The imaging assembly of claim 1, wherein the first slit and the second slit are part of a continuous slit extending along the second axis.

3. The imaging assembly of claim 1, wherein one or more of the first array and the second array comprise approximately between 1000 and 4000 detector elements along the first axis.

4. The imaging assembly of claim 1, wherein the first array and the second array have the same number of detector elements along the first axis.

5. The imaging assembly of claim 1, wherein the first array, the second array, and the gap filler array have the same number of detector elements in a direction parallel to the third axis.

6. The imaging assembly of claim 1, wherein the third axis is generally oriented along an axis of bilateral symmetry for the spectrometer.

7. The imaging assembly of claim 1, wherein the first module and the second module are adjacent to one another along the first axis.

8. The imaging assembly of claim 1, wherein the first gap filler array overlaps the first array and the second array by a number of detector elements in a direction parallel to the first axis.

9. The imaging assembly of claim 8, wherein the number of detector elements is approximately 10-20 detector elements.

10. A spectrometer comprising the imaging assembly of claim 1 and a dispersive element, wherein beams of electromagnetic radiation incident through the first slit and the second slit are dispersed by the dispersive element, such that resultant spectra of the electromagnetic radiation is projected onto the first array and/or the second array, and wherein beams of electromagnetic radiation incident through the gap filler slit are dispersed by the dispersive element, such that the resultant spectra of the electromagnetic radiation is projected onto the gap filler array.

11. The spectrometer of claim 10, further comprising a plurality of non-dispersive elements, wherein the spectrometer is a double pass spectrometer, and wherein the beam of electromagnetic radiation and the resultant spectra each pass through the plurality of non-dispersive elements.

12. The spectrometer of claim 11, wherein one or more of the plurality of non-dispersive elements comprise mirrors.

13. The spectrometer of claim 10, wherein the dispersive element comprises is a prism or a diffraction grating.

* * * * *